United States Patent Office 3,849,448
Patented Nov. 19, 1974

3,849,448
VAPOR PHASE OXIDATION OF BENZENE TO MALEIC ANHYDRIDE AT LOW OXYGEN TO BENZENE MOLAR RATIOS AND HIGH BENZENE CONCENTRATIONS
Clifford Archibald Crampton, 15 Wood End Road, Harpenden, England, and Charles Frederick Cardy, 14 Mount Grace Road, Stopley, Luton, England
No Drawing. Continuation of abandoned application Ser. No. 787,545, Dec. 27, 1968. This application Oct. 18, 1971, Ser. No. 190,375
Claims priority, application Great Britain, Jan. 3, 1968, 429/68
Int. Cl. C07d 5/10
U.S. Cl. 260—346.8 A          19 Claims

ABSTRACT OF THE DISCLOSURE

A benzene oxidation process for the production of maleic anhydride uses a gas feed mixture containing at least 4.55 volume percent of benzene optionally containing sulfur, an oxygen to benzene molar ratio of less than 4.5:1 together with a fluidised vanadium/molybdenum/phosphorus oxide catalyst on an inert support.

---

This application is a continuation of Ser. No. 787,545, filed Dec. 27, 1968, and now abandoned.

The invention relates to a vapour phase process for the production of maleic anhydride by the oxidation of benzene using an oxygen to benzene molar ratio of less than 4.5 to 1 in the presence of a fluidised oxidation catalyst.

A known vapour phase oxidation process for the preparation of maleic anhydride is based on the catalytic partial oxidation of benzene. In this process a gaseous mixture containing on a volume basis 1.5%, or less, benzene, remainder air, is contacted at elevated temperature with a suitable oxidation catalyst.

Although this process is specific for preparing maleic anhydride, in that oxidation by-products other than carbon dioxide and water are substantially absent from the reaction products, the process does present certain difficulties. Thus, for a given amount of benzene unduly large quantities of air are required to be handled. The high dilution of the maleic anhydride product, and of any unconverted benzene, in the reaction mixture complicates the recovery of these materials. Due to the difficulty involved in recovering unconverted benzene from a reaction mixture containing large quantities of air it is necessary to work under conditions giving high benzene conversions, but under conditions of high conversion the maleic anhydride product is more readily oxidised to carbon dioxide and water, and the yield of maleic anhydride is thereby reduced.

Attempts have been made to overcome one or other of these disadvantages. Thus for example, in one prior proposal enabling lower conversion rates to be employed, a gaseous mixture consisting of 0.3% v./v. benzene, remainder air, is passed through a first reaction vessel in which approximately a third of the benzene is converted to maleic anhydride, the maleic anhydride is then separated, and the gaseous mixture then passed to a second reaction vessel in which a further third of the benzene is converted to maleic anhydride. In another proposal, directed to improving the thermal efficiency of the process and to the avoidance of compressing large quantities of fresh air feed, a recycling technique is used in which part of the output gases from the reaction vessel is mixed with air and benzene to give a gaseous mixture containing 1.5% v./v. benzene and having a composition outside the explosion limits for that component mixture, the amount of oxygen being in excess of that theoretically required for complete oxidation of the benzene to carbon dioxide and water.

The equation representing the oxidation of benzene to maleic anhydride with a theoretical yield, requires 4.5 moles of oxygen per mole of benzene, and that representing the complete oxidation of benzene to carbon dioxide and water requires 7.5 moles of oxygen per mole of benzene. Heretofore in the prior process for preparing maleic anhydride by the oxidation of benzene and in the prior proposals for overcoming one or other of the disadvantages outlined above, an excess of oxygen over that theoretically required for the complete oxidation of benzene to carbon dioxide and water has always been used.

According to the present invention there is provided a process for the production of maleic anhydride by the catalytic partial oxidation of benzene which comprises contacting at an elevated temperature a gaseous mixture comprising benzene and molecular oxygen with a fluidised oxidation catalyst, the molar ratio of oxygen to benzene in the gaseous mixture being less than 4.5:1 and separating maleic anhydride from the resultant gaseous reaction mixture.

Preferably the molar ratio of oxygen to benzene in the gaseous mixture is greater than 0.5:1.

For a gaseous mixture having an oxygen to benzene molar ratio of less than 4.5:1 it would be expected that such gaseous mixture would give rise to a product mixture containing undesirably large amounts of oxidation products intermediate between benzene and maleic anhydride, in particular undesirably large amounts of p-benzoquinone. Contrary to expections, it has been surprisingly found that in the process according to the invention significant quantities of p-benzoquinone are not present in the product mixture, the concentration of p-benzoquinone in the product mixture being less than 0.01%, based on the weight of maleic anhydride obtained, and may be as low as 10 parts per million.

The process according to the invention enables gaseous mixtures of benzene and oxygen containing a higher concentration of benzene than was previously though possible to be employed in the preparation of maleic anhydride. For such mixtures a molar yield of maleic anhydride, based on the benzene converted to oxidation products, of 70%, or above may be obtained.

The invention further enables gaseous mixtures having a composition lying within the explosion range for that particular component mixture to be employed. It will be apparent that suitable precautions need to be taken in handling such gaseous mixtures prior to, and after, contact with the fluidised oxidation catalyst. For a gaseous mixture of benzene and air, for example, the upper explosion limit corresponds to a mixture containing 8% v./v. benzene, and mixtures having a benzene concentration somewhat below this figure and extending into the explosion range may be used.

Preferably the gaseous mixture contains a diluent gas such as nitrogen, argon or other inert gas, carbon dioxide, carbon monoxide, steam, or mixtures of these gases. Conveniently air may be employed as the source of both oxygen and diluent gas and mixed in the required proportions with benzene to form the gaseous mixture.

It has been found that small amounts of sulphur compounds may be present in the gaseous mixture without adversely affecting the process of the invention. This is unexpected since in the known process for preparing maleic anhydride by passing a mixture containing 1.5% v./v., or less, benzene remainder air over a fixed bed catalyst, sulphur compounds have a deleterious effect on the catalyst. Thus in the process of the invention, a sulphur-containing benzene may be employed that is a benzene containing small amounts of sulphur compounds such as carbon disulphide and thiophen. Commercial benzene, which typically may contain up to 0.2% weight percent sulphur present mainly as carbon disulphide and thiophen, may advantageously be used with a resulting saving in cost of raw material.

Where benzene containing small amounts of sulphur compounds is used, it has further been found that the sulphur content of any benzene recovered from the product mixture is considerably lower than that of the feed benzene, and that benzene having a sulphur content of less than about 10 p.p.m. may be obtained. Thus the process of the invention enables substantially sulphur free benzene to be obtained as a valuable additional product from a relatively cheap commercial benzene feed.

It is envisaged that in the process of the invention any oxidation catalyst may be used provided that the catalyst is active in relation to the oxidation of benzene to maleic anhydride and is capable of being suitably fluidised. Preferably the catalyst comprises a catalyst mixture supported on an inert support. Examples of suitable catalyst mixtures are those based on tungsten oxide, vanadium oxide or molybdenum oxide. Particularly suitable catalyst mixtures are those containing both vanadium oxide and molybdenum oxide, the weight ratio of the oxides expressed as $V_2O_5:MoO_3$ desirably in the range of from 3:1 to 1:4 and preferably about 1:2. Preferably an additive, such as phosphorus oxide, is present in the catalyst mixture. Most advantageously the catalyst mixture contains vanadium oxide, molybdenum oxide and phosphorus oxide, preferably in a weight ratio expressed as $V_2O_5:MoO_3:P_2O_5$ of about 1.0:2.0:0.4.

The inert support for the catalyst mixture may for example be silica gel, alumina or silicon carbide. Particularly suitable supports are fused alumina having a surface area of less than 1 square meter per gram and silica gel having a surface area of less than 400 square meters per gram, desirably less than 250 square meters per gram. Such silica gel supports may be prepared by dry-heating of a higher surface area silica gel at a temperature which is preferably within the range of from 400°–1100° C., desirably from 900°–1000° C. The reduction in surface area obtained depends upon both the temperature and the time of heating and a silica gel of desired surface area may be obtained by a suitable choice of these parameters. Dry-heating of the higher surface area silica gel may be advantageously effected by maintaining the silica gel in a fluidised condition during heating, for example, by means of a stream of dry air.

For a particular catalyst, the reaction temperature and contact time are chosen to give, for a particular conversion rate, the optimum yield of maleic anhydride. In general, the temperature will be within the range of from 250° C. to 500° C. and the contact time will be within the range of from about 1 to 10 seconds.

In the process of the invention, dissipation of heat evolved in the oxidation reaction is more readily effected than for processes employing a fixed bed catalyst. The fluidised condition of the catalyst employed in the invention facilitates control of the reaction temperature and the rapid attainment of a stable set of operating conditions both on start-up of the reaction and on changing, where required, from one set of operating conditions to another set of conditions. Hot spots which often occur in a fixed catalyst bed and which give rise to over oxidation are effectively eliminated. The process of the invention in employing a fluidised catalyst, is potentially less hazardous than a process in which a fixed bed catalyst is used, and it is therefore possible to employ in the process of the invention a gaseous mixture of benzene and air, for example, whose composition lies in the explosion range. Further, reactors having a higher capacity than is reasonable for a fixed bed catalyst may be used with a resulting saving in capital and operating costs.

Maleic anhydride may be separated from the product mixture issuing from the reaction zone by scrubbing the mixture with benzene. Maleic anhydride, substantially free from water, may be obtained by contacting the product mixture with benzene under reflux conditions so that maleic anhydride is dissolved and separated by the descending liquid reflux and water present in the product mixture is entrained in the ascending benzene vapour. The ascending mixture of benzene and water may subsequently be separated in known manner. Since the solution of maleic anhydride obtained in this manner is substantially free from water, hydrolysis of maleic anhydride to maleic acid and subsequent formation of fumaric acid is avoided. Maleic anhydride may be separated from the benzene solvent by any suitable method and the benzene recycled.

The invention will now be illustrated by way of the following examples:

EXAMPLE 1

A catalyst containing by weight 6% molybdenum trioxide, 3% vanadium pentoxide, 1.2% phosphorus pentoxide, remainder fused alumina, was used. The fused alumina was of B.S.S. mesh size 46–170 and surface area less than 1 square meter per gram and constituted a support for the other materials which constituted a catalyst mixture.

The catalyst was prepared as follows. A mixture of 54 g. of molybdenum trioxide and 50 ml. of 0.880 aqueous ammonia solution was warmed to effect substantial solution of the molybdenum trioxide and to this mixture was added 200 ml. of concentrated hydrochloric acid followed by 100 g. of oxalic acid. 27 g. of vanadium pentoxide and then 10.8 g. of phosphorus pentoxide were dissolved in the resulting solution to produce a solution of the catalyst mixture. The solution of the catalyst mixture was mixed with 808.2 g. of the fused alumina support specified above which completely absorbed the solution. Water vapour, hydrochloric acid and finally ammonium chloride were removed from the impregnated support by heating the support, whilst stirring, until a dry, free running material was obtained, and then fluidising the support in a stream of air at 200° C. The catalyst so formed was activated by heating for 6 hours at approximately 450° C. in a stream of air which maintained the catalyst in a fluidised condition.

The catalyst was charged to an electrically heated vertical reactor tube of internal diameter 5 cm. and length 120 cm. to a bed height of 43 cm. A gaseous mixture of benzene and air, preheated to 120°–150° C. was passed through the heated reactor in which the mixture was contacted with the catalyst under the conditions shown in Table 1. The gaseous mixture served to fluidise the catalyst and maintain the catalyst in this condition throughout the run.

The gas stream issuing from the reactor and constituting the product mixture and containing air, unreacted benzene, maleic anhydride, carbon dioxide and water was passed through a filter to remove any entrained catalyst and then to a packed scrubber column in which the gas stream was contacted with hot refluxing benzene. Maleic anhydride was separated from the gas stream by the descending liquid reflux and collected at the bottom of the column as a solution in benzene. The remainder of the gas stream, in which the water formed during the oxidation reaction was entrained as a mixture of benzene and water, on ascending the column was cooled to condense the benzene and water which were collected and separated in a side arm positioned towards the top of the column. By this separation method the solution of maleic anhydride in benzene which was obtained was effectively free from water. Hydrolysis of maleic anhydride to maleic acid and subsequent formation of fumaric acid was thereby avoided.

The conversion of benzene to oxidation products was found by measuring the benzene balance for the system.

The maleic anhydride and p-benzoquinone were determined in known manner, the latter being expressed as parts per million present in the maleic anhydride produced.

The reaction conditions employed and the results obtained are shown in Table 1.

TABLE 1

|  | Run number | | | |
|---|---|---|---|---|
|  | 1 | 2 | 3 | 4 |
| Percent v./v. benzene contained in gaseous mixture of benzene and air | 8.6 | 8.6 | 8.6 | 10.0 |
| Molar ratio of oxygen to benzene | 2.23:1 | 2.23:1 | 2.23:1 | 1.89:1 |
| Reaction temperature in ° C | 463 | 430 | 404 | 409 |
| Contact time in seconds | 3.4 | 3.7 | 4.0 | 5.4 |
| Percent molar conversion of benzene to oxidation products | 20 | 21 | 16 | 18 |
| Yield of maleic anhydride as molar percent, based on molar percent benzene converted to oxidation products | 67 | 68 | 75 | 76 |
| Output of maleic anhydride, in g./litre of catalyst/hour | 28 | 28 | 23.5 | 23 |
| p-Benzoquinone, in p.p.m | <10 | <10 | <10 | <10 |

EXAMPLE 2

This example illustrates the use of benzene containing sulphur compounds.

In runs 5 and 6, given below, the gaseous mixture contained 8.6% v./v. benzene, remainder air. In run 5 the benzene was pure benzene containing less than 2 p.p.m. sulphur. In run 6 the benzene contained 1% v./v. thiophen corresponding to 0.46 weight percent of sulphur calculated as sulphur. For both runs the reaction temperature was 420° C., the contact time 3.8 seconds and the catalyst and procedure as for Example 1.

The results obtained after 6 hour running periods are shown in Table 2.

TABLE 2

|  | Run number | |
|---|---|---|
|  | Run 5—pure benzene | Run 6—benzene containing 1% v./v. thiophen |
| Percent molar conversion of benzene to oxidation products | 19 | 20 |
| Yield of maleic anhydride, as molar percent, based on molar percent benzene converted to oxidation products | 69 | 69 |
| p-Benzoquinone, in p.p.m | <10 | <10 |

As will be seen from the above results, no effective difference in the benzene conversion, nor in the yields of maleic anhydride, was obtained on introducing the sulphur compound into the gaseous mixture.

EXAMPLE 3

In this example, gaseous mixtures of benzene and air containing 8.6% v./v. and 15.2% v./v. benzene were used with catalysts containing, by weight, 15.3% and 10.2% of catalyst mixture, remainder support. The support for each run was silica gel.

The silica gel support for a particular run was obtained by heating silica gel of surface area 500 square meters per gram and of B.S.S. mesh size 44–250 at 900° to 1000° C. for a period of from one half to four hours in a tube in which the silica gel was maintained in a fluidised condition by a stream of dry air. During heating, shrinkage of the silica gel and a resulting reduction in surface areas occurred. The reduction in surface area which was obtained was a function of the temperature and the time of heating.

The catalyst mixture was prepared and deposited on the silica gel in a manner similar to that described for Example 1 and for each run the apparatus and procedure employed were also as for Example 1.

The composition of the catalyst and gaseous mixture, the reaction conditions employed and the results obtained for a series of runs are shown in Table 3.

TABLE 3

|  | Run number | | | |
|---|---|---|---|---|
|  | 7 | 8 | 9 | 10 |
| Percent v./v. benzene contained in gaseous mixture of benzene and air | 15.2 | 15.2 | 8.6 | 8.6 |
| Molar ratio of oxygen to benzene | 1.17:1 | 1.17:1 | 2.23:1 | 2.23:1 |
| Surface area of silica support m.²/g | 500 | 150 | 353 | 153 |
| Catalyst mixture as percent by weight of total catalyst (i.e. catalyst mixture plus support): | | | | |
| MoO₃ | 6.0 | 6.0 | 9.0 | 9.0 |
| V₂O₅ | 3.0 | 3.0 | 4.5 | 4.5 |
| P₂O₅ | 1.2 | 1.2 | 1.8 | 1.8 |
| Reaction temperature in ° C | 326 | 325 | 280 | 280 |
| Contact time, in seconds | 6.15 | 6.15 | 4.3 | 4.3 |
| Percent molar conversion of benzene to oxidation products | 3.5 | 9.8 | 5.4 | 5.8 |
| Yield of maleic anhydride as molar percent, based on molar percent benzene converted to oxidation products | 49 | 58 | 48 | 65 |
| Output of maleic anhydride in g./l. of catalyst/hr | 5 | 7.5 | 5.5 | 8.1 |
| p-Benzoquinone, in p.p.m | <10 | <10 | <10 | <10 |

EXAMPLE 4

This example illustrates the use of gaseous mixtures of benzene and air in a process according to the invention and having compositions extending into the explosion range for benzene and air.

The catalyst contained, by weight, 6% MoO₃, 3% V₂O₅ and 1.2% P₂O₅ supported on a silica gel support of surface area of 87 square meters per gram. The silica gel support was prepared by heating silica gel of surface area 500 square meters per gram in the manner set out in Example 3, while the catalyst mixture was prepared and deposited on the prepared silica gel support in a manner similar to that described in Example 1.

The results obtained for a series of runs are shown in Table 4. For each run the apparatus and procedure were as for Example 1 except that where gaseous mixtures in the explosion range were employed, suitable flash-back arrestors were included in the gas lines. A reaction temperature of 315° C. and contact time of 4.3 seconds were employed in each run.

TABLE 4

|  | Run number | | |
|---|---|---|---|
|  | 11 | 12 | 13 |
| Percent v./v. benzene contained in gaseous mixture of benzene and air | 8.6 | 5.65 | 4.55 |
| Molar ratio of oxygen to benzene | 2.23:1 | 3.5:1 | 4.4:1 |
| Percent molar conversion of benzene to oxidation products | 7.3 | 9.0 | 11.0 |
| Yield of maleic anhydride as molar percent, based on molar percent benzene converted to oxidation products | 67 | 56 | 50 |
| Output of maleic anhydride in g./l. of catalyst/hr | 10.5 | 7 | 5.5 |
| p-Benzoquinone, in p.p.m | <10 | <10 | <10 |

What is claimed is:

1. A process for the production of maleic anhydride by the catalytic partial oxidation of benzene comprising the steps of contacting at elevated temperature a gaseous mixture containing benzene and molecular oxygen, said gaseous mixture containing at least 4.55 volume percent of benzene and having an oxygen to benzene molar ratio of less than 4.5 to 1, with a fluidised oxidation catalyst and separating maleic anhydride from the resultant gaseous mixture.

2. A process as claimed in claim 1 wherein the benzene contains up to 0.5 weight percent of sulphur.

3. A process as claimed in claim 1, wherein the gaseous mixture contains a diluent gas which is inert to the reactants and products.

4. A process as claimed in claim 1, wherein the elevated temperature lies within the range of from 250° C. to 500° C.

5. A process as claimed in claim 1, wherein the gaseous mixture is contacted with a fluidised oxidation catalyst for a contact time of from 1 to 10 seconds.

6. A process as claimed in claim 1, wherein the oxidation catalyst comprises one or more metal oxides selected from the group consisting of vanadium oxide, molybdenum oxide and tungsten oxide supported on an inert support.

7. A process as claimed in claim 6, wherein the inert support is alumina having a surface area of up to 1 square meter per gram.

8. A process as claimed in claim 6, wherein the inert support is silica gel having a surface area of up to 400 square meters per gram.

9. A process for the production of maleic anhydride by the catalytic partial oxidation of benzene comprising the steps of contacting at an elevated temperature of from 250° C. to 500° C. a gaseous mixture of benzene and air, said gaseous mixture containing at least 4.55 volume percent of benzene and having an oxygen to benzene molar ratio of less than 4.5:1, with a fluidised oxidation catalyst, and scrubbing the resultant gaseous reaction mixture with refluxing benzene to effect separation of maleic anhydride from the said resultant gaseous mixture and subsequently recovering the maleic anhydride from the resulting mixture of benzene and maleic anhydride.

10. A process as claimed in claim 9 wherein scrubbing of the resultant gaseous reaction mixture is effected by contacting the said resultant gaseous reaction mixture with benzene in a zone containing the vapour phase of benzene maintained under reflux, removing from the zone water vapour present in the resultant gaseous reaction mixture by withdrawing vapours containing benzene and water from said zone and removing maleic anhydride from the zone by withdrawing liquid reflux containing benzene and maleic anhydride from the zone.

11. A process as claimed in claim 10, wherein any unreacted benzene in the resultant gaseous reaction mixture is recovered together with benzene employed in the scrubbing operation and at least part of the recovered benzene is recycled to said contacting of said gaseous catalyst with said fluidised oxidation catalyst.

12. A process as claimed in claim 6, wherein the catalyst comprises essentially vanadium oxide, molybdenum oxide and phosphorus oxide supported on said inert support.

13. A process as claimed in claim 12, wherein the catalyst consists of vanadium oxide, molybdenum oxide and phosphorus oxide in a weight ratio of 1.0:2.0:0.4 expressed as $V_2O_5:MoO_3:P_2O_5$ on said inert support.

14. A process as claimed in claim 9, wherein said gaseous mixture contains from about 4.55 to about 15.2 volume percent of benzene.

15. A process as claimed in claim 1, wherein the oxygen to benzene molar ratio is greater than about 0.5:1.

16. A process as claimed in claim 9, wherein the oxygen to benzene molar ratio is greater than about 0.5:1.

17. A process for the production of maleic anhydride by the catalytic partial oxidation of benzene, comprising the steps of contacting at elevated temperature a gaseous mixture containing benzene and molecular oxygen, said gaseous mixture containing from about 4.55 to about 15.2 volume percent of benzene and having an oxygen to benzene molar ratio of less than 4.5 to 1, with a fluidised oxidation catalyst and separating maleic anhydride from the resultant gaseous mixture.

18. A process for the production of maleic anhydride by the catalytic partial oxidation of benzene, comprising the steps of contacting at an elevated temperature a gaseous mixture containing benzene and molecular oxygen, said gaseous mixture containing about 4.55 to about 15.2 volume percent of benzene and having an oxygen to benzene molar ratio of less than 4.5:1, with a fluidised oxidation catalyst comprising one or more metal oxides selected from the group consisting of vanadium oxide, molybdenum oxide and tungsten oxide supported on an inert denum oxide and tungsten oxide supported on an inert support, and separating maleic anhydride from the resultant gaseous mixture.

19. A process for the production of maleic anhydride by the catalytic partial oxidation of benzene, comprising the steps of contacting, at a temperature in the range 250° C. to 500° C., a gaseous mixture comprising air and benzene with a fluidised oxidation catalyst, separating maleic anhydride and benzene from the resulting gaseous mixture and recycling at least part of the benzene, said gaseous mixture of air and benzene containing from 4.55 to 15.2 volume per cent of benzene and having an oxygen to benzene molar ratio of less than 4.5:1, and said catalyst comprising phosphorus pentoxide and at least one oxide selected from the group of oxides consisting of vanadium pentoxide, molybdenum trioxide and tungsten trioxide supported on an inert carrier.

References Cited
UNITED STATES PATENTS

| | | | |
|---|---|---|---|
| 2,574,511 | 10/1951 | Toland | 260—346.8 |
| 2,777,860 | 1/1957 | Egbert et al. | 260—346.8 |

FOREIGN PATENTS

| | | | |
|---|---|---|---|
| 415,748 | 8/1934 | Great Britain | 260—346.8 |

OTHER REFERENCES

Chementator, Chemical Engineering, July 24, 1961, pp. 57–58.

Brauchbar, Robert-Über die Katalytische Gasphasenoxydation von Benzol an Vanadium oxide-kontakten. (Doctoral Thesis)—Juris Verlag Zurich (1964), important pages are 20, 21, and 38–43, pp. 9–13, 19–21, 30–34, 78–79 also cited.

Kullavanijaya; Phasook-Dissertation Abstracts B, vol. 27 (7), p. 2336 (1967).

NATALIE TROUSOF, Primary Examiner

B. DENTZ, Assistant Examiner

U.S. Cl. X.R.

260—346.8 M